(12) United States Patent
Durkee et al.

(10) Patent No.: US 10,358,054 B2
(45) Date of Patent: Jul. 23, 2019

(54) VARIABLE-SIZED SEAT BACK FOR A VEHICLE SEAT

(71) Applicant: Faurecia Automotive Seating, LLC, Auburn Hills, MI (US)

(72) Inventors: Chad W. Durkee, Troy, MI (US); Todd Sieting, Clarkston, MI (US); Shaun D. Tait, Troy, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 113 days.

(21) Appl. No.: 15/633,128

(22) Filed: Jun. 26, 2017

(65) Prior Publication Data
US 2018/0009339 A1  Jan. 11, 2018

Related U.S. Application Data

(60) Provisional application No. 62/358,293, filed on Jul. 5, 2016.

(51) Int. Cl.
| | |
|---|---|
| *B60N 2/20* | (2006.01) |
| *B60N 2/22* | (2006.01) |
| *B60N 2/64* | (2006.01) |
| *B60N 2/30* | (2006.01) |
| *B60N 2/90* | (2018.01) |
| *B60N 2/66* | (2006.01) |
| *A47C 7/46* | (2006.01) |
| *B60N 2/02* | (2006.01) |

(52) U.S. Cl.
CPC ............ *B60N 2/2222* (2013.01); *B60N 2/20* (2013.01); *B60N 2/3011* (2013.01); *B60N 2/643* (2013.01); *B60N 2/914* (2018.02); *A47C 7/467* (2013.01); *B60N 2/22* (2013.01); *B60N 2/64* (2013.01); *B60N 2/665* (2015.04); *B60N 2002/0268* (2013.01)

(58) Field of Classification Search
CPC ........ B60N 2/2222; B60N 2/914; B60N 2/20; B60N 2/22; B60N 2/3011; B60N 2/643; B60N 2/665; B60N 2/64; B60N 2002/0268; A47C 7/467
USPC ...................................... 297/284.1
See application file for complete search history.

(56) References Cited

U.S. PATENT DOCUMENTS 5,082,326 A * 1/1992 Sekido .................. B60N 2/914
297/284.6
6,273,810 B1 8/2001 Rhodes, Jr.
(Continued)

FOREIGN PATENT DOCUMENTS

| | | |
|---|---|---|
| DE | 10355519 A1 | 6/2005 |
| EP | 1839933 | 10/2007 |

OTHER PUBLICATIONS

Partial European Search Report for European App. No. 17179225 dated Jan. 3, 2018, 4079 EP ||, 14 pages.
(Continued)

*Primary Examiner* — Mark R Wendell
(74) *Attorney, Agent, or Firm* — Barnes & Thornburg LLP

(57) ABSTRACT

An occupant support adapted for use in a vehicle includes a seat bottom coupled to a floor of the vehicle and a seat back configured to pivot about a seat-back pivot axis relative to the seat bottom between an upright position and a folded-forward position. The occupant support further includes an upper-back support system configured to support an upper back of an occupant of the occupant support.

20 Claims, 10 Drawing Sheets

(56) References Cited

U.S. PATENT DOCUMENTS

| | | |
|---|---|---|
| 6,283,547 B1 | 9/2001 | Bauer |
| 9,884,574 B2 * | 2/2018 | Mizoi ..................... B60N 2/62 |
| 9,896,003 B2 * | 2/2018 | Tamura ................ B60N 2/2222 |
| 2007/0228790 A1 * | 10/2007 | Schurg ................... A47C 7/467 |
| | | 297/284.4 |
| 2010/0244525 A1 | 9/2010 | Ito |
| 2016/0096448 A1 | 4/2016 | Line |
| 2016/0229316 A1 * | 8/2016 | Tamura ................ B60N 2/2222 |

OTHER PUBLICATIONS

Extended European Search Report for European App. No. 17179225.2 dated Apr. 5, 2018, 4079 EP ‖, 11 pages.

Office Action dated Nov. 2, 2018 for U.S. Appl. No. 15/613,869 (pp. 1-5).

* cited by examiner

VARIABLE-SIZED SEAT BACK FOR A VEHICLE SEAT

PRIORITY CLAIM

This application claims priority under 35 U.S.C. § 119(e) to U.S. Provisional Application Ser. No. 62/358,293, filed Jul. 5, 2016 which is expressly incorporated by reference herein.

BACKGROUND

The present disclosure relates to occupant supports, and particularly to occupant supports used in vehicles. More particularly, the present disclosure relates to an occupant support having a variable seat back.

SUMMARY

According to the present disclosure, a vehicle includes an occupant support mounted to a floor of the vehicle. The occupant support includes a seat bottom coupled to the floor of the vehicle for movement therewith and a seat back coupled to the seat bottom for movement about a seat-back pivot axis relative to the seat bottom between an upright position and a folded-forward position.

In illustrative embodiments, the occupant support further includes an upper-back support system configured to move relative to the seat back between a plurality of positions to accommodate different sized occupants of the occupant support. The upper-back support system provides support for an upper back portion proximal to the occupant's shoulder area.

In illustrative embodiments, seat back includes a frame and trim arranged to surround the frame. The upper-back support system includes an adjustable back support and an actuator located between the frame and the adjustable back support. The actuator is configured to move between a retracted state and a fully-extended state to cause the adjustable back support to translate relative to the frame and rotate about a rotation axis relative to the frame. The rotation axis moves relative to the frame in response to movement of the actuator between the retracted state and the fully-extended state.

In illustrative embodiments, the upper-back support system includes the adjustable back support and a support adjuster. The support adjuster is configured to move the adjustable back support relative to the seat back from a first arrangement to a second arrangement in response to receiving a control input when a first sized occupant is supported by the occupant support and for moving the adjustable back support relative to the seat back from the first arrangement to a third arrangement in response to receiving the control input when a second sized occupant is supported by the occupant support.

In illustrative embodiments, the trim defines a seat cavity and the upper-back support system is located in the seat cavity. The upper-back support system includes an inflatable bladder configured to inflate and deflate selectively to vary an outer contour of the seat back.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 11:
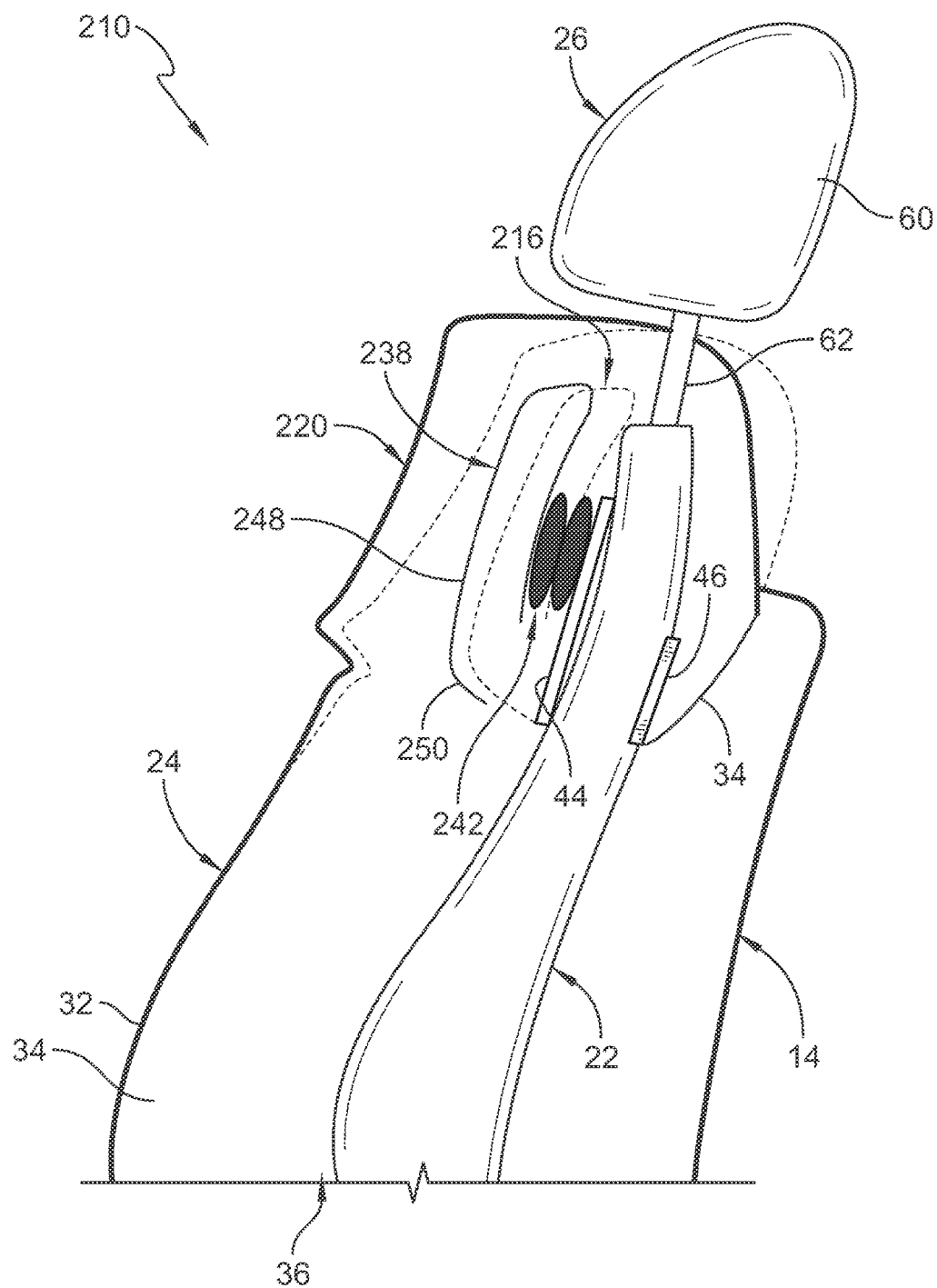
FIG. 11 is an elevation and diagrammatic view of another embodiment of an occupant support in accordance with the present disclosure showing that the occupant support includes a seat back and an upper-back support system, the upper back support system including an adjustable back support and a plurality of inflatable bladders, and the inflatable bladders are staked between the adjustable back support and the frame included in the seat back.
Figure 12:
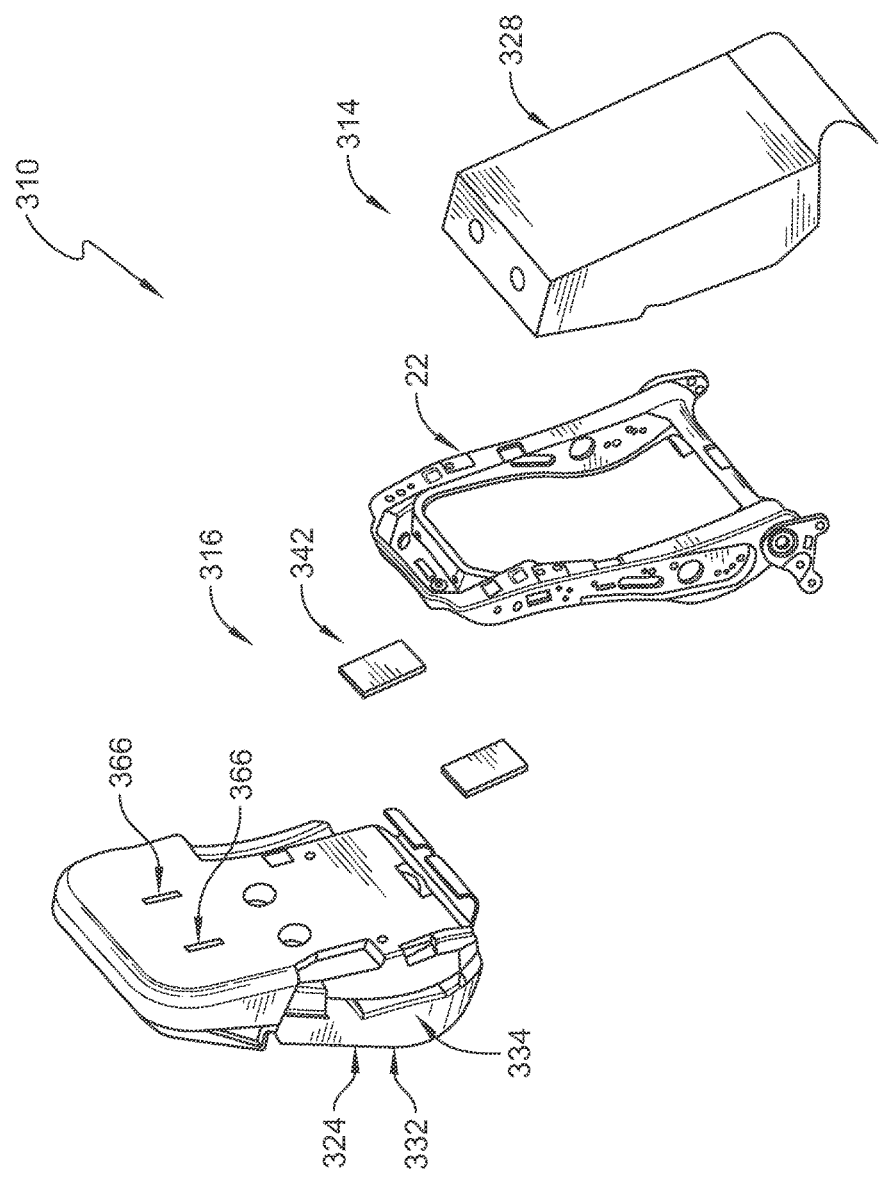
FIG. 12 is an exploded view of another embodiment of an occupant support in accordance with the present disclosure showing that the occupant support includes a seat back and an upper-back support system, the seat back including a frame, trim, and a panel, and the upper-back support system including a plurality of inflatable bladders configured to be positioned between the frame and the trim to vary selectively an outer contour of the seat back.

A first embodiment of an occupant support 10 in accordance with the present disclosure is adapted for use in a vehicle as shown in FIGS. 1A-10. A second embodiment of an occupant support 210 in accordance with the present disclosure is shown in FIG. 11. A third embodiment of an occupant support 310 in accordance with the present disclosure is shown in FIG. 12.

The occupant supports 10, 210, 310 are configured to support an occupant 11 thereon and each include a seat bottom 12 and a seat back 14, 314. The occupant supports 10, 210, 310 further include upper-back support systems 16, 216, 316 respectively and the upper-back support systems 16, 216, 316 are configured to move relative to the seat back 14, 314 to vary an outer contour 20 of the seat back 14, 314 to accommodate different sized occupants 11 of the occupant supports 10, 210, 310 as suggested in FIGS. 1A-2B, 11, and 12. In the illustrative embodiment, the occupant supports 10, 210, 310 are driver side occupant supports, however any occupant support may be any occupant support in the vehicle.

The upper-back support system 16 includes an actuator 42 located within a seat cavity 36 formed in the seat back 14. The actuator 42 is configured to move between a retracted state and a fully-extended state to vary the outer contour 20 of the seat back 14. In one example, the actuator 42 includes an inflatable bladder 42 configured to inflate and deflate selectively.

The upper-back support system 16 includes an adjustable back support 38 and support-adjuster means 40 for moving the adjustable back support 38 relative to the seat back 14 from a first arrangement to a second arrangement in response to receiving a control input when a first sized occupant 11 is supported by the occupant support 10 and for moving the adjustable back support 38 relative to the seat back 14 from the first arrangement to a third arrangement in response to receiving the control input when a second sized occupant 11 is supported by the occupant support 10.

Figure 5:
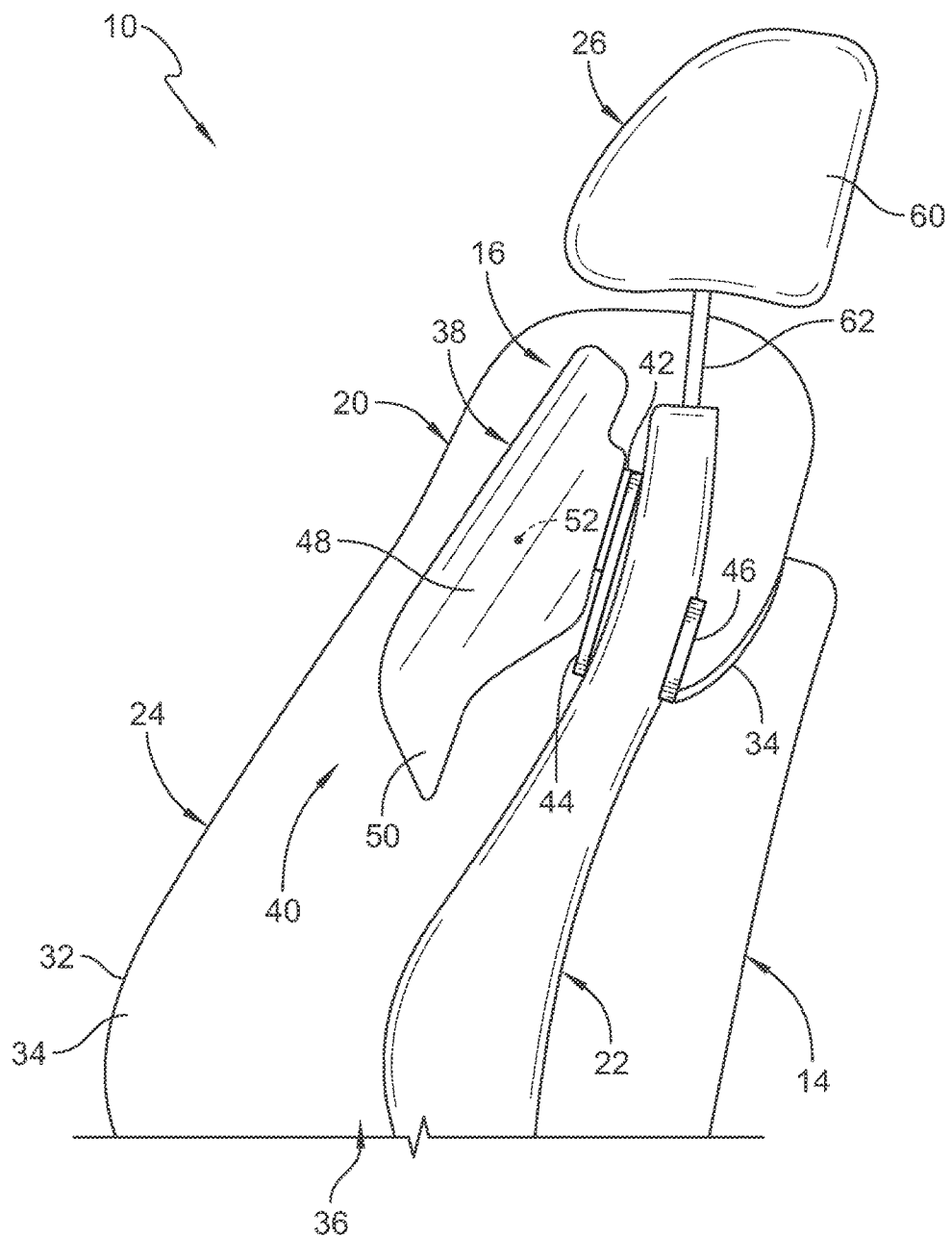
FIG. 5 is a view similar to FIG. 1A showing the upper-back support system coupled to the frame and suggesting that the inflatable bladders are deflated to cause the adjustable back support to assume a first arrangement in which the seat back has a first outer contour for supporting an upper back of an occupant and suggesting that the adjustable back support is free to rotate relative to the frame about a rotation axis in response to a load being applied to the adjustable back support.
Figure 6:
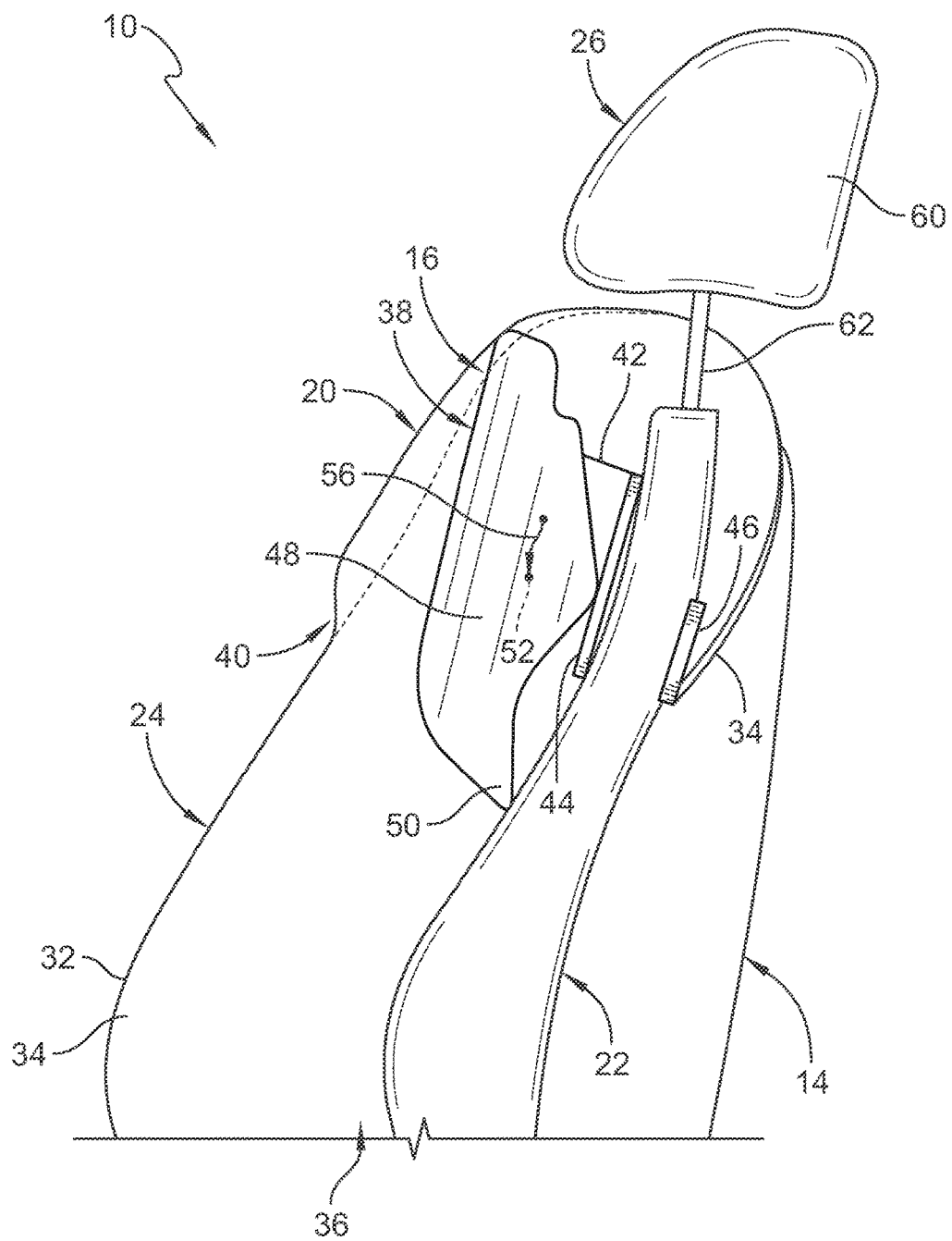
FIG. 6 is a view similar to FIG. 5 showing that the inflatable bladders are fully inflated to cause the adjustable back support to move relative to the frame and assume a second arrangement in which the seat back has a second outer contour and suggesting that the rotation axis of the adjustable back support moves relative to the frame along a first path during inflation of the inflatable bladders to the fully inflated state.
Figure 7:
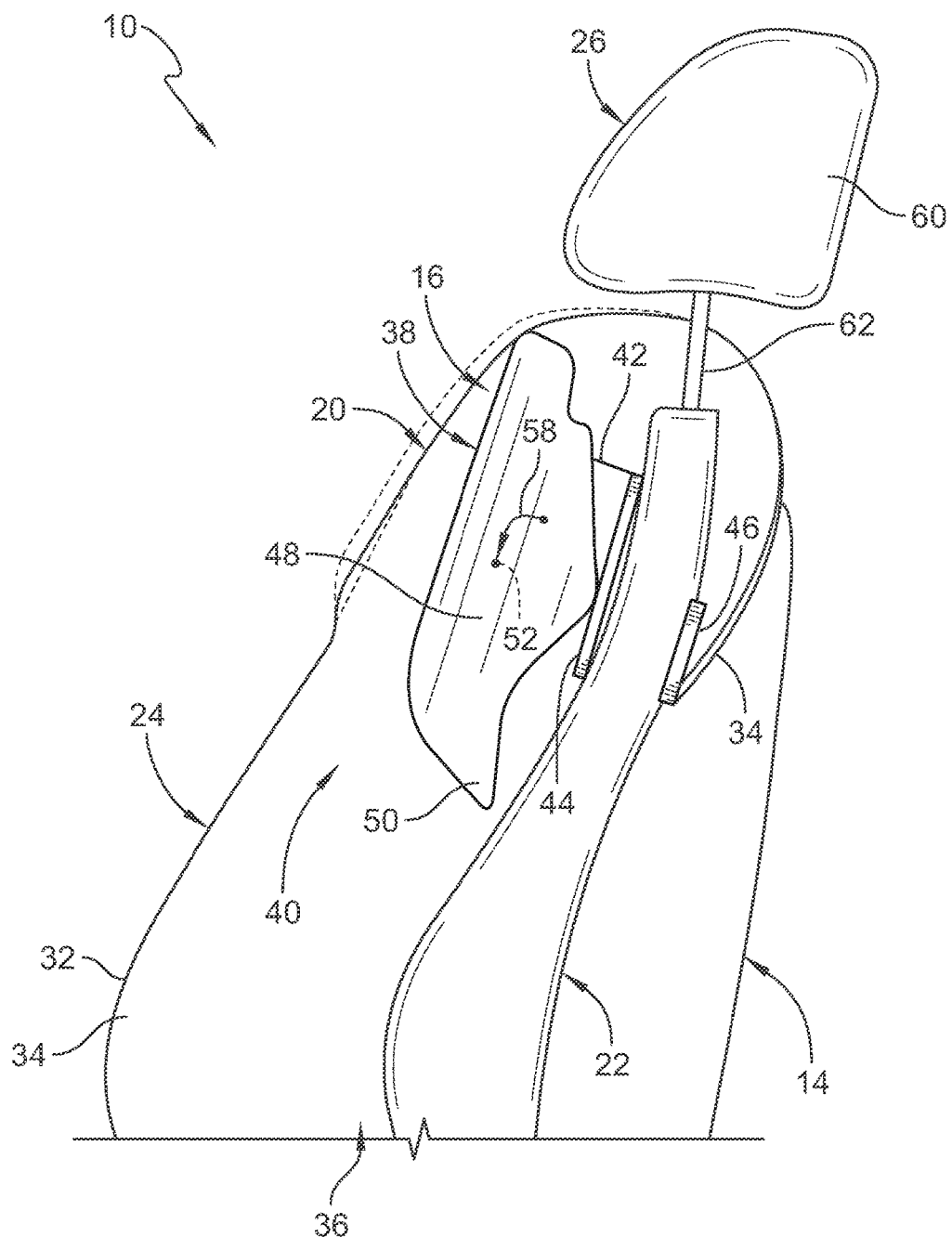
FIG. 7 is a view similar to FIGS. 5 and 6 showing that the inflatable bladders are partially inflated to cause the adjustable back support to move relative to the frame and assume a third arrangement in which the seat back has a third outer contour and suggesting that the rotation axis of the adjustable back support moves relative to the frame along a second path during inflation of the inflatable bladders to the partially inflated state.
Figure 8:
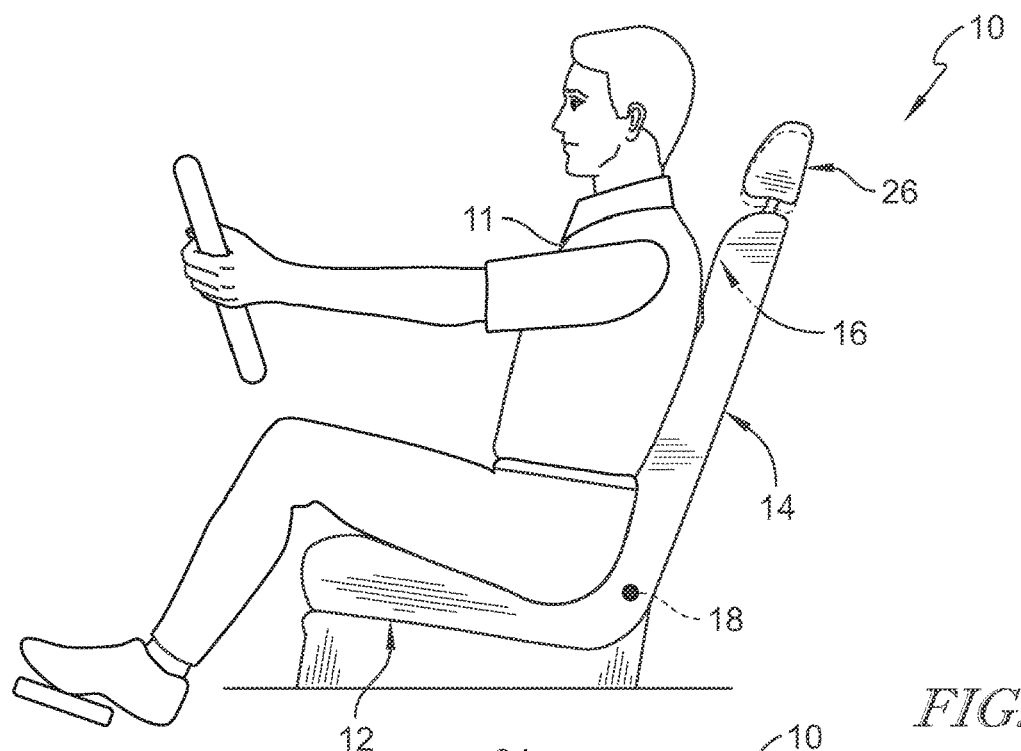
FIG. 8 is an elevation view of the occupant support of FIG. 1 suggesting that the headrest included in the seat back is mounted to move relative to the frame between an outward position and an inward position.

The adjustable back support 38 includes a body 48 and a pivot lever 50 as shown in FIGS. 5-7. The body 48 is shaped to receive the upper back of the occupant 11. The pivot lever 50 extends away from the body 48 toward a frame 22 included in the seat back 14 and the pivot lever 40 is configured to provide a pivot or fulcrum for the adjustable back support 38 to pivot relative to the frame 22 about a rotation axis 52. In one example, the rotation axis 52 moves in response to movement of the actuator 42 between the retracted state and the fully extended state.

The occupant support 10 includes the seat bottom 12, the seat back 14, and the upper-back support system 16 as shown in FIGS. 1A-10. The seat bottom 12 is adapted to be coupled to a floor of a vehicle for movement therewith. The seat back 14 is coupled to the seat bottom 12 for movement about a seat-back pivot axis 18 relative to the seat bottom 12 between an upright position and a folded-forward position as suggested in FIG. 10. The upper-back support system 16 is configured to vary selectively the outer contour 20 of the seat back 14 to accommodate different sized occupants 11.

Figures 1A, 1B:
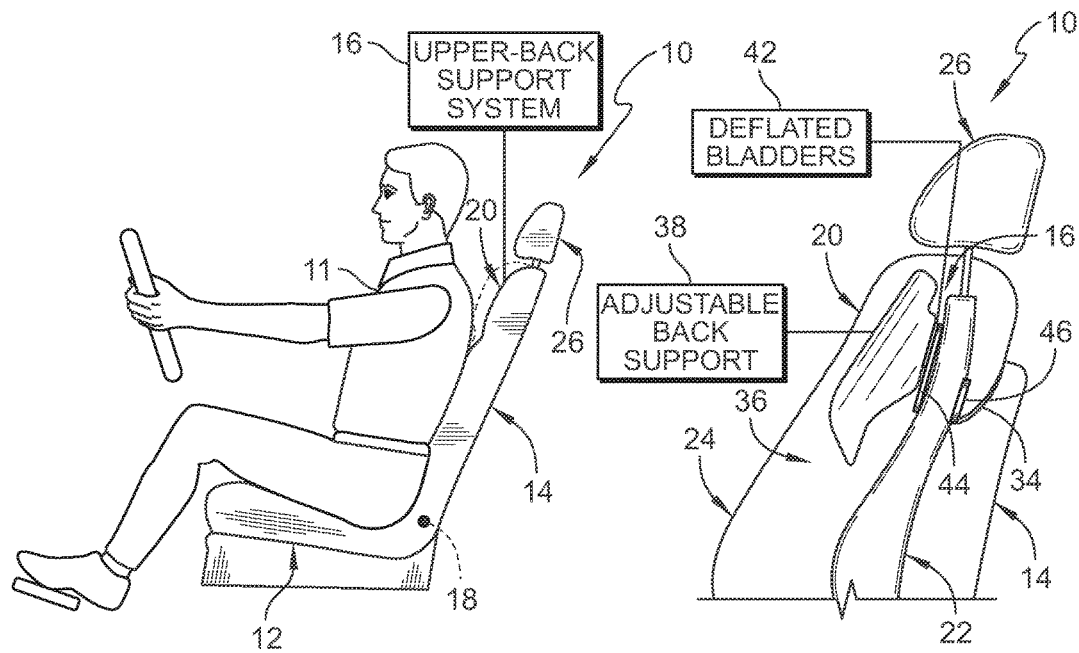
FIG. 1A is an elevation and diagrammatic view of an occupant support for use in a vehicle in accordance with the present disclosure with an occupant seated on the occupant support, the occupant support including a seat bottom, a seat back, and an upper-back system configured to vary selectively the outer contour of an upper back portion of the seat back as suggested in FIG. 2A to accommodate different sized occupants.
FIG. 1B is an elevation and diagrammatic view of the occupant support of FIG. 1 showing that the seat back includes a frame and trim arranged around the frame and the upper-back system includes an adjustable back support and inflatable bladders configured to inflate and deflate selectively to move the adjustable back support and vary the outer contour of the seat back and suggesting that the inflatable bladders are deflated to cause the adjustable back support to assume a first arrangement.
Figures 2A, 2B:
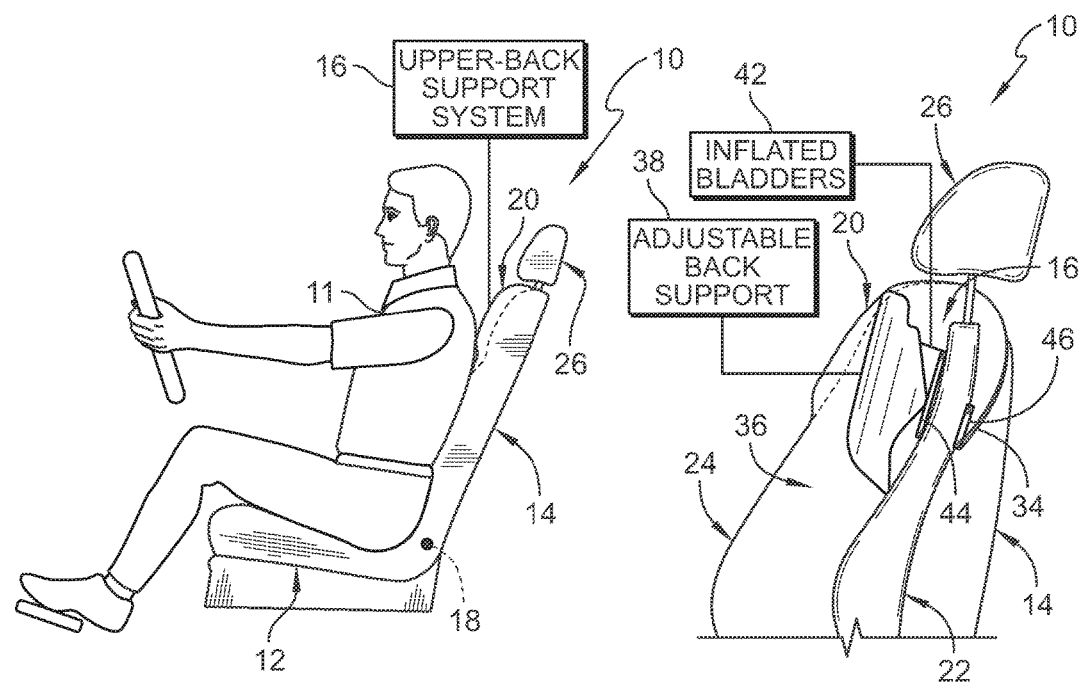
FIG. 2A is a view similar to FIG. 1A showing the outer contour of the upper back portion of the seat back has been changed to extend toward the occupant and away from the frame as a result of inflating the inflatable bladders to cause the adjustable back support included in the upper-back support system to move relative to the frame.
FIG. 2B is a view similar to FIG. 1B showing that the inflatable bladders have been inflated to move the adjustable back support included in the upper-back support system relative to the frame to vary the outer contour of the upper back portion of the seat back.
Figure 3:
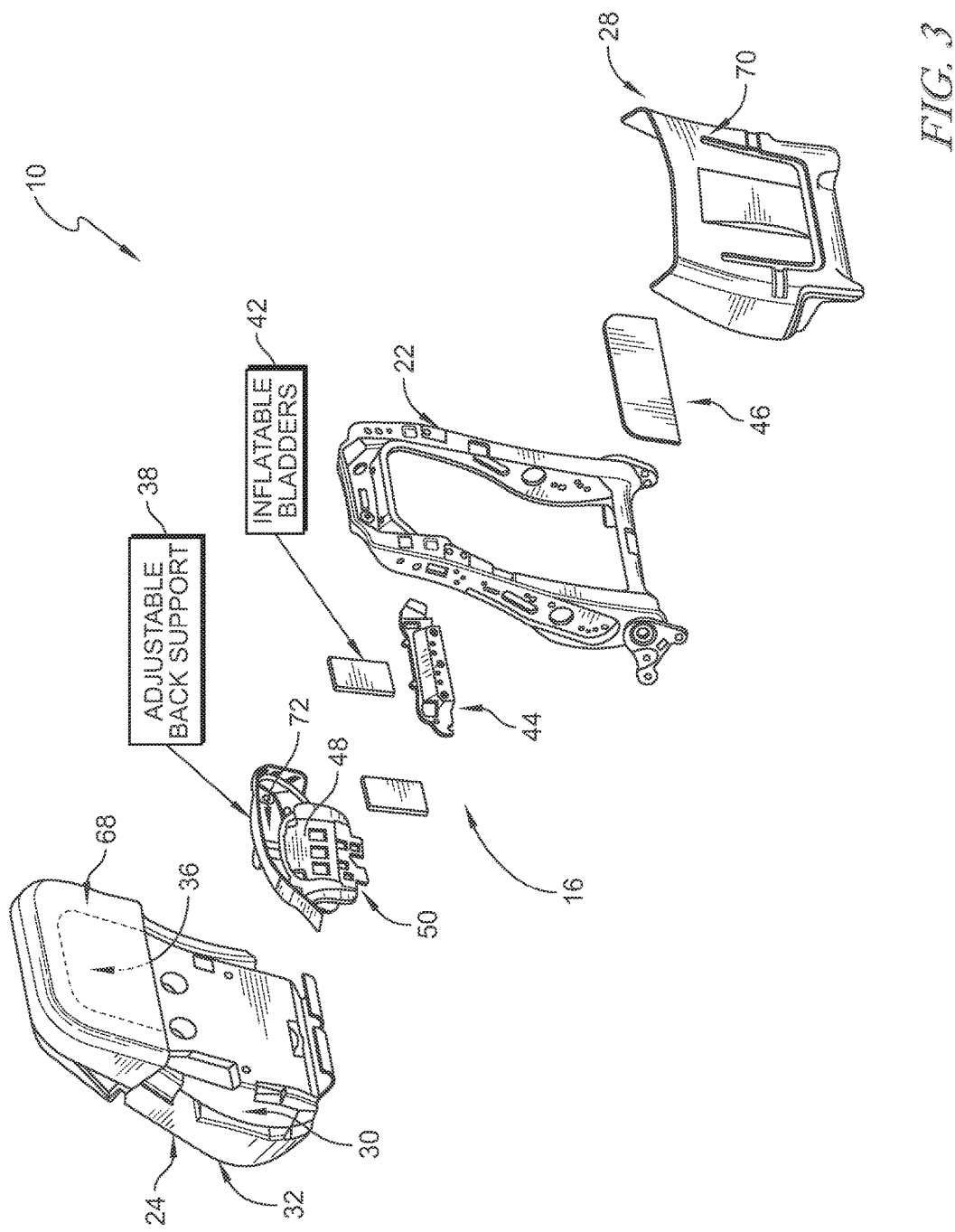
FIG. 3 is an exploded perspective view of the seat back and upper-back support system showing that the upper-back support system includes the adjustable back support, inflatable bladders, a fixed mount, and a rear mount and further showing that the seat back includes the trim, the frame, and a rear panel.
Figure 4:
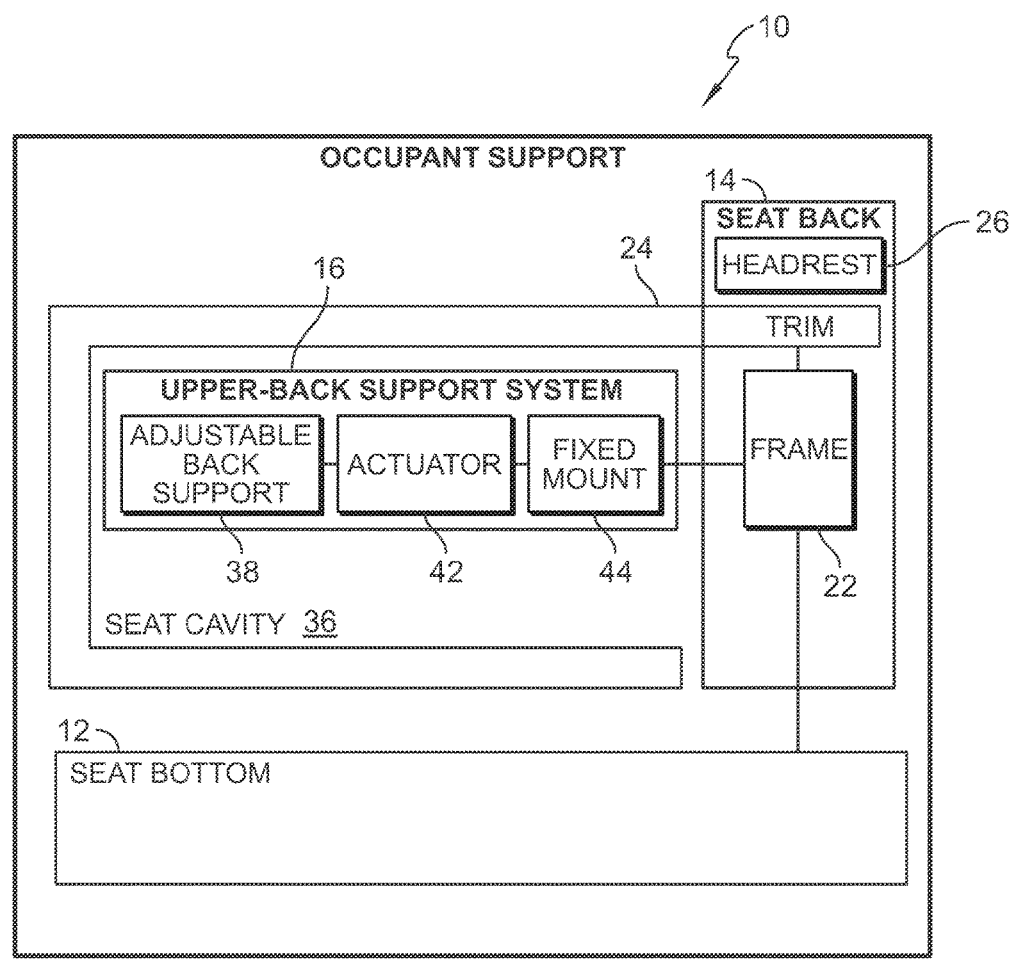
FIG. 4 is a diagrammatic view of the occupant support of FIG. 1 showing that the occupant support includes the seat bottom, the seat back, and the upper-back support system, the upper-back support system including the adjustable back support, the inflatable bladders, and the fixed mount, and the seat back including the frame, the headrest coupled to the frame, and the trim arranged around the frame and the upper-back support system.

The seat back 14 includes the frame 22 and trim 24 as shown in FIGS. 3 and 4. The frame 22 is rigid and coupled to the seat bottom 12 for movement therewith. The illustrative frame 22 is configured to pivot relative to the seat bottom 12 about the seat-back pivot axis 18. The trim 24 is arranged around the frame 22 and adapted to provide a comfortable and supportive interface for the occupant 11. In one example, the seat back 14 further includes a headrest 26 and a rear panel 28 as shown in FIGS. 3 and 4.

The trim 24 is formed to include a seat cavity 36 and the frame 22 is located in the seat cavity 36 as shown in FIGS. 4 and 5. The trim 24 is adapted to stretch in elastically relative to the frame 22 in response to movement of the upper-back support system 16 and in response to loads applied to the seat back 14 by the occupant 11 as suggested in FIGS. 5-7.

The trim 24 illustratively includes an inner layer 30, an outer layer 32 arranged around the inner layer 30, and an elastic band 34 as suggested in FIGS. 3 and 5-7. In one example, the inner layer 30 is made from a foam material. The outer layer 32 is illustratively made from an upholstery material such as, for example, cloth, leather, and synthetic materials such as, for example, polyethylene terephthalate and vinyl. The elastic band 34 is coupled to the outer layer 32 and to the frame 22. The elastic band 34 is configured to expand and contract in response to movement of the outer layer 32 relative to the frame 22 caused by movement of the actuator 42 between the retracted state and the fully-extended state.

In some embodiments, the foam includes a hood. In some embodiments, the trim 24 includes additional layers such as, for example, one or more of an adhesive layer, a temperature control layer, a sensor layer, an additional foam layer, or an additional upholstery layer.

The upper-back support system 16 includes the adjustable back support 38 and the actuator 42 as shown in FIGS. 3-7. The adjustable back support 38 is located in the seat cavity 36 formed in the seat back 14 and configured to support the upper back of the occupant 11. The actuator 42 is configured to selectively move the adjustable back support 38 relative to the frame 22.

The adjustable back support 38 may be formed from plastic, metal, or another suitable material. In the illustrative embodiment, adjustable back support 38 is located between the frame 22 and the trim 24. In other embodiments, the adjustable back support 38 is located between the inner and outer layers 30, 32 of the trim 24. The adjustable back support 38 may be located between seat foam and a seat cover.

The adjustable back support 38 includes a body 48 and a pivot lever 50 as shown in FIGS. 5-7. The body 48 is shaped to receive the upper back of the occupant 11. In the illustrative embodiment, the body 48 has a concave shape that extends inward toward the frame 22. In the illustrative embodiment, the body 48 is formed to define an actuator-receiver cavity 72 sized to receive a portion of the actuator 42. The pivot lever 50 extends away from the body 48 toward the frame 22 and is configured to provide a pivot or fulcrum for the adjustable back support 38 to pivot relative to the frame 22 about a rotation axis 52.

The pivot lever 50 is not directly coupled to the frame 22 as suggested in FIG. 5. The pivot lever 50 is free to translate and rotate relative to the frame 22 as suggested in FIGS. 5-7. As such, the rotation axis 52 upon which the adjustable back support 38 pivots is free to move relative to the frame 22 as suggested in FIGS. 5-7. The rotation axis 52 is free to translate relative to the frame 22. In some embodiments, the pivot lever 50 is rotably coupled to the frame 22.

In the illustrative embodiment, the pivot lever 50 includes converging sides configured to provide a fulcrum when pushed toward the frame 22 as suggested in FIG. 6. In some examples, the pivot lever 50 includes at least one of converging sides, a flexing element, a bending element, and a living hinge.

The actuator 42 is located in the seat cavity 36 formed by the seat back 14 between the adjustable back support 38 and the frame 22 as shown in FIGS. 5-7. The actuator 42 is configured to move between the retracted state and the fully-extended state to move the adjustable back support 38 relative to the frame 22. In the illustrative embodiment, the actuator 42 includes the plurality of inflatable bladders 42.

In some examples, the plurality of bladders 42 includes one or more bladders 42. In some examples, the upper-back support system 16 further includes a pneumatic system including a pump for inflating and deflating the bladders 42. In some examples, the pneumatic system is integrated into the occupant support 10. In some examples, a plurality of bladders 42 are stacked between the frame 22 and the adjustable back support as suggested in FIG. 11. In some examples, a plurality of bladders 42 are arranged in a lateral configuration. In some examples, each bladder 42 is individually inflatable and deflatable independent of the other bladders 42.

In some examples, the actuator includes at least one of an electrically-activated polymer, an electric motor, a piezoelectric material, a shape memory alloy, combinations thereof, or any other suitable alternative. In some embodiments, the adjustable seat back 38 is omitted and the actuator 42 varies the outer contour 20 of the seat back 14 as suggested in FIG. 12.

The illustrative upper-back support system 16 further includes a fixed mount 44 and a rear mount 46 as shown in FIGS. 3 and 4. The fixed mount 44 and the rear mount 46 are coupled to the frame 22 for movement therewith. The fixed mount 44 is positioned between the actuator 42 and the frame 22 and provides a reaction surface for the actuator 42 to act upon. The elastic band 34 is coupled to the rear mount 46 and to the outer layer 32 in the illustrative embodiment.

In operation, the actuator 42 moves between the retracted state and the fully-extended state to move the adjustable back support 38 relative to the frame 22 to vary the outer contour 20 of the seat back 14 as suggested in FIGS. 5-7. As a result, the seat back 14 accommodates different sized occupants 11 and supports a given occupant 11 in one of a plurality of positions to improve support and comfort.

When the actuator 42 is in the retracted state and a first sized occupant 11 is supported by the occupant support 10, the adjustable back support 38 is in a first arrangement as shown in FIG. 5. As a result, the outer contour 20 has a first contour and the adjustable back support 38 supports the occupant 11 in a first position. In the illustrative embodiment, the adjustable back support 38 is free to pivot relative to the frame 22 about the rotation axis 52 in response to a load being applied to the adjustable back support 38 by the occupant 11. For example, the load may be caused by the weight of the upper back of the occupant 11 being applied to the adjustable seat back 38.

The actuator 42 moves from the retracted state toward the fully-extended state in response to a control input as suggested in FIGS. 6 and 7. In some embodiments, the control input is provided by activating a switch to power the actuator 42. In some embodiments, the control input is provided by the occupant 11 activating a pump via manual power or electric power.

When the actuator 42 is in the fully-extended state and the first sized occupant 11 is supported by the occupant support 10, the adjustable back support 38 is in a second arrangement as shown in FIG. 6. As a result, the outer contour 20 has a second contour and the adjustable back support 38 supports the occupant 11 in a second position. In the illustrative embodiment, the pivot lever 50 included in the adjustable back support 38 is engaged with the frame 22 to cause the adjustable back supported to be rotated about the rotation axis 52. In other embodiments, the adjustable back support 38 is free to pivot relative to the frame 22 about the rotation axis 52 in the second arrangement in response to a load being applied to the adjustable back support 38.

The adjustable back support 38 moves relative to the seat back 14 from the first arrangement shown in FIG. 5 to the second arrangement shown in FIG. 6 along a first path 56 as suggested in FIG. 6. The rotation axis 52 moves in response to movement of the actuator 42. As a result, the rotation axis 52 moves relative to the frame 22 as the adjustable seat back 48 moves to cause translation and rotation of the adjustable seat back 48.

When a second sized occupant 11 is supported by the occupant support 10, the adjustable seat back 38 is free to move from the first arrangement to a third arrangement in response to the control input as compared to that of the first sized occupant 11. When the actuator 42 is in the fully-extended state and the second sized occupant 11 is supported by the occupant support 10, the adjustable back support 38 is in a third arrangement as shown in FIG. 7. As a result, the outer contour 20 has a third contour and the adjustable back support 38 supports the occupant 11 in a third position. In the illustrative embodiment, the pivot lever 50 included in the adjustable back support 38 is spaced apart from the frame 22 and may be further rotated about the rotation axis 52.

The adjustable back support 38 moves relative to the seat back 14 from the first arrangement to the third arrangement along a second path 58. In the illustrative embodiment, the second path 58 is different than the first path 56. The control input for moving the adjustable seat back 38 from the first arrangement to the second arrangement is the same as the control input for moving the adjustable seat back 38 from the first arrangement to the third arrangement. As such, a magnitude and application time of the control input is the same for moving the adjustable seat back 38 in both scenarios.

The actuator 42 is further free to move a partially-extended state between the retracted state and the fully-extended state. In the partially-extended state, the adjustable seat back 38 assumes a fourth arrangement. Movement of the adjustable back support 38 and the actuator 42 is absorbed, at least in part, by the trim 24. As a result, the trim 24 may impart a load on the adjustable back support 38 toward the frame 22. For example, the trim 24 may provide a loaded spring effect that urges the actuator 42 toward the retracted state. In some embodiments, movement of the adjustable back support 38 compresses the trim 24 such as, for example, a foam layer of the trim 24.

In some embodiments, the upper-back support system 16 includes the adjustable back support 38 and support-adjuster means 40 as shown in FIGS. 5-7. The support-adjuster means 40 is adapted for moving the adjustable back support 38 relative to the seat back 14 from the first arrangement to the second arrangement in response to receiving the control input when the first sized occupant 11 is supported by the occupant support 10 and for moving the adjustable back support 38 relative to the seat back 14 from the first arrangement to the third arrangement in response to receiving the control input when the second sized occupant is supported by the occupant support 10. In illustrative embodiments, the support-adjuster means 38 includes the fixed mount 44, the inflatable bladder 42, and the trim 24. In some embodiments, the support-adjuster means 38 includes the inflatable bladder 42 and the trim 24.

The illustrative seat back 14 includes the headrest 26 and the rear panel 28 as shown in FIG. 3. The headrest 26 included in the seat back 14 is mounted to the frame 22 to support the rear of the occupant's head. The rear panel 28 included in the seat back 14 is arranged along the rear of the seat back 14 to support and protect the seat back 14.

The headrest 26 includes a headrest pad 60 and guiderails 62 that extend from the headrest pad 60 into the frame 22 to couple the headrest 26 to the frame 22. The guiderails 62 are configured to slide into and out of the frame 22 to adjust a height of the headrest pad 60 as suggested in FIG. 8.

Figure 9:
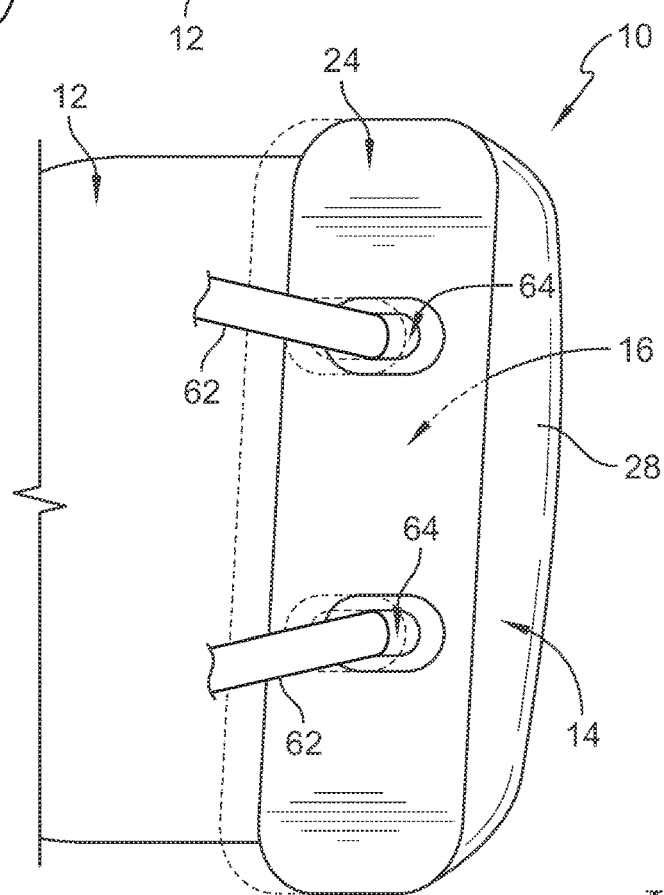
FIG. 9 is a top view of the occupant support of FIG. 8 showing that the headrest includes guideposts that extend into the frame and the trim is formed to include elongated post slots that receive the guideposts and suggesting that the elongated post slots are configured to move relative to the guideposts in response to the outer contour of the seat back changing.

The trim 24 is formed to include elongated guide slots 64 as shown in FIG. 9. The guiderails 62 included in the headrest 26 extend through the elongated guide slots 64 into the frame 22. The elongated guide slots 64 compensate for the trim 24 moving, expanding, and contracting relative to the frame without snagging or bunching around the guiderails 62.

The rear panel 28 includes an upper member 68 and a lower member 70. In the illustrative embodiment, the upper and lower members 68, 70 are separate components. In some embodiments, the rear panel 28 is a single component as suggested in FIG. 12. In some embodiments, the upper member 68, is hingedly coupled to the lower member 70.

Upper back adjustment provided by upper-back support system 16 may allow for additional upper back and shoulder support for taller seat occupants that may not get the back support desired from adjusting the recliner alone. Traditionally upper back adjustment systems may be mechanically driven by a motor pushing a plate rotating about a specific pivot point on the seat back.

In some illustrative embodiments of the present disclosure, a pneumatic based system is used with bladders place in the seat back to allow for desired adjustment and uniform support across the back of the occupant. The adjustable back support 38 may be included to provide a firm surface for support. The movement of the system may be absorbed on the outside of the seat by design considerations in the trim including the foam to allow for movement (slits, holes, etc.) and stretch within the seat surface (cloth, leather). The bladders may be pneumatic and use a pump. A pump may be present in the seat for other pneumatic functions like lumbar or massage.

In illustrative embodiments, the headrest does not move with the upper back adjustment system. Movement of the headrest with the upper back adjustment system may lead to a condition in which the upper back position may be comfortable but the headrest position may not be comfortable for the occupant.

As shown for example in FIG. 11, another embodiment of an occupant support 210 includes the seat bottom 12, the seat back 14, and the upper-back support system 216. The upper-back support system 216 includes an adjustable back support 238 and an actuator 242 as shown in FIG. 11. The adjustable back support 238 is located in the seat cavity 36 formed in the seat back 14 and configured to support the upper back of the occupant 11. The actuator 242 is configured to selectively move the adjustable back support 238 relative to the frame 22. The illustrative upper-back support system 216 further includes the fixed mount 44 and the rear mount 46.

In the illustrative embodiment, adjustable back support 238 is located between the frame 22 and the trim 24 of the seat back 14 as shown in FIG. 11. The adjustable back support 238 includes a body 248 and a pivot lever 250. The body 248 is shaped to receive the upper back of the occupant 11. The pivot lever 250 extends away from the body 248 toward the frame 22 and is configured to provide a pivot or fulcrum for the adjustable back support 238 to pivot relative to the frame 22 about a rotation axis.

In the illustrative embodiment, the pivot lever 250 is not directly coupled to the frame 22 as suggested in FIG. 11. The pivot lever 250 is free to translate and rotate relative to the frame 22. In the illustrative embodiment, the pivot lever 250 is configured to provide a fulcrum when pushed toward the frame 22. In some embodiments, the pivot lever 250 includes at least one of converging sides, a flexing element, a bending element, and a living hinge.

The actuator 242 is located in the seat cavity 36 formed by the seat back 14 between the adjustable back support 238 and the frame 22 as shown in FIG. 11. The actuator 242 is configured to move between a retracted state and a fully-extended state to move the adjustable back support 238 relative to the frame 22. In the illustrative embodiment, the actuator 242 includes a plurality of inflatable bladders 242. The plurality of bladders 242 are stacked between the frame 22 and the adjustable back support 238 as suggested in FIG. 11.

Figure 10:
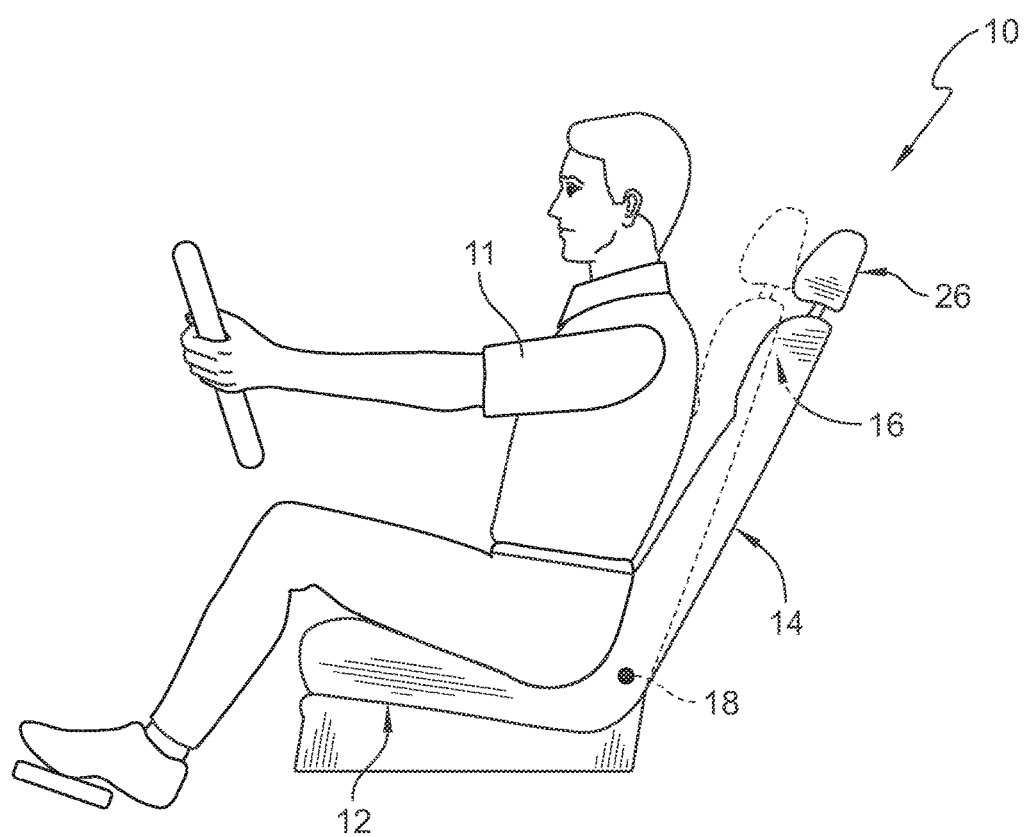
FIG. 10 is an elevation view of the occupant support of FIG. 8 suggesting that the seat back is coupled to the seat bottom for movement about a seat-back pivot axis relative to the seat bottom between an upright position and a folded-forward position.

As shown for example in FIG. 12, another embodiment of an occupant support 310 includes the seat bottom 12, a seat back 314, and the upper-back support system 316 as shown in FIGS. 10 and 12. The seat back 314 is coupled to the seat bottom 12 for movement about a seat-back pivot axis 18 relative to the seat bottom 12 between an upright position and a folded-forward position. The upper-back support system 316 is configured to vary selectively an outer contour of the seat back 314 to accommodate different sized occupants.

The seat back 314 includes the frame 22 and trim 324 as shown in FIG. 12. The frame 22 is rigid and coupled to the seat bottom 12 for movement therewith. The illustrative frame 22 is configured to pivot relative to the seat bottom 12 about the seat-back pivot axis 18. The trim 324 is arranged around the frame 22 and adapted to provide a comfortable and supportive interface for the occupant 11. In some embodiments, the seat back 314 further includes the headrest 26 and a rear panel 328.

The trim 324 illustratively includes an inner layer 330 and an outer layer 332 arranged around the inner layer 330. In some embodiments, the trim 324 includes elastic band 34. In the illustrative embodiment, the inner layer 330 is made from a foam material. The outer layer 332 is illustratively made from an upholstery material such as, for example, cloth, leather, and synthetic materials such as, for example, polyethylene terephthalate and vinyl. In some embodiments, the trim 324 includes additional layers such as, for example, one or more of an adhesive layer, a temperature control layer, a sensor layer, an additional foam layer, or an additional upholstery layer. The trim 324 is formed to include slits 366 that face the frame 22.

The upper-back support system 316 includes an actuator 342 as shown in FIG. 12. The actuator 342 is located in a seat cavity formed in the seat back 314 and configured to support the upper back of the occupant 11. The actuator 342 is configured to selectively move relative to the frame 22 to vary an outer contour of the seat back 314. In some embodiments, the upper-back support system 316 further includes the fixed mount 44 and the rear mount 46.

The actuator 342 is configured to move between the retracted state and the fully-extended state to vary the outer contour relative to the frame 22. In the illustrative embodiment, the actuator 342 includes a plurality of inflatable bladders 42. A portion of the bladders 342 is received in the slits 366 formed in the trim 324. In some embodiments, a portion of the motion of the inflated bladders 342 is directed toward the frame.

In some embodiments, the upper-back support system 316 further includes a pneumatic system including a pump for inflating and deflating the bladders 342. In some embodiments, the pneumatic system is integrated into the occupant support 310.

The invention claimed is:

1. An occupant support comprising
a seat bottom,
a seat back coupled to the seat bottom for movement about a seat-back pivot axis relative to the seat bottom between an upright position and a folded-forward position, and
an upper-back support system configured to move relative to the seat back between a plurality of positions to accommodate different sized occupants of the occupant support, the upper-back support system including an adjustable back support and support-adjuster means for moving the entire adjustable back support relative to the seat back from a first arrangement to a second arrangement in response to receiving a control input when a first sized occupant is supported by the occupant support and for moving the entire adjustable back support relative to the seat back from the first arrangement to a third arrangement in response to receiving the control input when a second sized occupant is supported by the occupant support.

2. The occupant support of claim 1, wherein the adjustable back support moves relative to the seat back from the first arrangement to the second arrangement along a first path and the adjustable back support moves relative to the seat back from the first arrangement to the third arrangement along a second path.

3. The occupant support of claim 2, wherein the second path is different than the first path.

4. The occupant support of claim 3, wherein the seat back includes a frame and a headrest coupled to the frame for movement with the frame and for movement relative to the frame, the adjustable back support is configured to move with the frame and relative to the frame, and the adjustable back support is configured to move relative to the headrest.

5. The occupant support of claim 4, wherein the adjustable back support includes a body shaped to receive an upper back of an occupant and a pivot lever that extends away from the body toward the frame and the pivot lever is configured to translate relative to the frame.

6. The occupant support of claim 1, wherein the adjustable back support includes a body shaped to receive an upper back of an occupant and a pivot lever that extends away from the body toward the frame, the pivot lever is spaced apart from the seat back when the adjustable back support is in the first arrangement, and the pivot lever engages the seat back when the adjustable back support is in the second arrangement.

7. An occupant support comprising
a seat bottom,
a seat back coupled to the seat bottom for movement about a seat-back pivot axis relative to the seat bottom between an upright position and a folded-forward position, the seat back including a frame and trim arranged around the frame, and the trim defines an outer contour of the seat back adapted to interface with an occupant of the occupant support, and
an upper-back support system configured to vary selectively the outer contour of the seat back to accommodate different sized occupants, the upper-back support system including an adjustable back support positioned between the frame and the trim and an actuator positioned between the adjustable back support and the frame, the actuator configured to move between a retracted state and a fully-extended state to cause the adjustable back support to translate relative to the frame and to rotate about a rotation axis relative to the frame, and the adjustable back support is free to rotate about the rotation axis relative to the frame and the actuator in response to the actuator being in the retracted state and in response to the actuator being in the fully-extended state.

8. The occupant support of claim 7, wherein the adjustable back support includes a body shaped to receive an upper back of the occupant and a pivot lever that extends away from the body toward the frame and the pivot lever is configured to translate relative to the frame.

9. The occupant support of claim 8, wherein the actuator includes an inflatable bladder.

10. The occupant support of claim 8, wherein the pivot lever includes at least one of converging sides, a flexing element, a bending element, and a living hinge.

11. The occupant support of claim 7, wherein the upper-back support system further includes a fixed mount coupled to the frame for movement therewith and the actuator includes a first inflatable bladder located between the fixed mount and the adjustable back support and a second inflatable bladder located between the fixed mount and the first inflatable bladder.

12. The occupant support of claim 7, wherein the seat back further includes a headrest, the headrest is movable relative to the frame, and movement of the adjustable back support is independent of movement of the headrest.

13. The occupant support of claim 12, wherein the actuator includes at least one of an electrically-activated polymer, an electric motor, a piezoelectric material, and a shape memory alloy.

14. The occupant support of claim 7, wherein the trim includes an outer layer adapted to interface with the occupant of the occupant support, an inner layer located between the outer layer and the frame, and an elastic band coupled to the outer layer and the frame, the elastic band is configured to expand and contract in response to movement of the outer layer relative to the frame caused by movement of the actuator between the retracted state and the fully-extended state.

15. The occupant support of claim 14, wherein the seat back further includes a headrest including a headrest pad and guideposts that extend into the frame to couple the headrest with the frame and the trim is formed to include elongated post slots that receive the guideposts.

16. An occupant support comprising
a seat bottom,
a seat back coupled to the seat bottom for movement about a seat-back pivot axis relative to the seat bottom between an upright position and a folded-forward position, the seat back having a trim that defines a seat cavity and a frame located in the seat cavity, and
an upper-back support system including a first inflatable bladder located within the seat cavity and the first inflatable bladder configured to inflate and deflate selectively,
wherein the upper-back support system further includes an adjustable back support, the first inflatable bladder is located between the frame and the adjustable back support, and the entire adjustable back support is free to translate and rotate relative to the frame while the first inflatable bladder is inflated or deflated.

17. The occupant support of claim 16, wherein the upper-back support system further includes a second inflatable bladder spaced apart from the frame to locate the first inflatable bladder between the frame and the second inflatable bladder.

18. The occupant support of claim 17, wherein the adjustable back support is free to rotate relative to the frame in response to the first inflatable bladder and the second inflatable bladder being fully inflated.

19. The occupant support of claim 16, wherein the seat back further includes a headrest, the headrest is movable relative to the frame, and inflation and deflation of the first inflatable bladder is independent of movement of the headrest.

20. The occupant support of claim 16, wherein the adjustable back support is movable between a first arrangement in which the entire adjustable back support is spaced apart from the frame and a second arrangement in which at least a portion of the adjustable back support engages the frame.

* * * * *